US012566251B2

(12) United States Patent
Allouis et al.

(10) Patent No.: US 12,566,251 B2
(45) Date of Patent: Mar. 3, 2026

(54) INTEGRATED AND COMPACT LIDAR MEASUREMENT SYSTEM

(71) Applicant: YellowScan, Montferrier-sur-Lez (FR)

(72) Inventors: Tristan Allouis, Montpellier (FR);
Nassim Doukkali, Montpeyroux (FR);
Michel Assenbaum, Montpeyroux (FR)

(73) Assignee: YellowScan, Montferrier-sur-Lez (FR)

( * ) Notice: Subject to any disclaimer, the term of this patent is extended or adjusted under 35 U.S.C. 154(b) by 973 days.

(21) Appl. No.: 17/753,400

(22) PCT Filed: Aug. 31, 2020

(86) PCT No.: PCT/FR2020/051515
§ 371 (c)(1),
(2) Date: Mar. 2, 2022

(87) PCT Pub. No.: WO2021/044095
PCT Pub. Date: Mar. 11, 2021

(65) Prior Publication Data
US 2022/0299608 A1 Sep. 22, 2022

(30) Foreign Application Priority Data
Sep. 2, 2019 (FR) ...................................... 1909621

(51) Int. Cl.
*G01S 7/481* (2006.01)
*G01S 17/93* (2020.01)
(52) U.S. Cl.
CPC .......... *G01S 7/4813* (2013.01); *G01S 7/4817* (2013.01); *G01S 17/93* (2013.01)

(58) Field of Classification Search
CPC ............................... G01S 7/4813; F25B 21/02
See application file for complete search history.

(56) References Cited

U.S. PATENT DOCUMENTS

| | | | |
|---|---|---|---|
| 11,226,256 B2 * | 1/2022 | Gál ........................ | G01M 3/007 |
| 2009/0046752 A1 | 2/2009 | Bueche et al. | |
| 2013/0010307 A1 * | 1/2013 | Greiner ................. | G01S 7/4813 |
| | | | 356/601 |
| 2014/0009330 A1 * | 1/2014 | Knight ................... | H01Q 19/13 |
| | | | 342/175 |
| 2017/0211932 A1 * | 7/2017 | Zadravec ............. | G02B 27/646 |

(Continued)

OTHER PUBLICATIONS

International Search Report for Application No. PCT/FR2020/051515 dated Nov. 12, 2020, 3 pages.

(Continued)

*Primary Examiner* — Robert W Hodge
*Assistant Examiner* — Clara G Chilton
(74) *Attorney, Agent, or Firm* — TraskBritt

(57) ABSTRACT

A LIDAR measurement system comprises: —a frame comprising a plurality of side members connected to each other in order to define an internal space; —a laser scanner attached to one end of the frame and having at least one projecting portion that is arranged outside the internal space; —a tracking device attached without any degree of freedom to the laser scanner and arranged in the internal space; —a cooling device comprising at least one heat collector arranged in the measurement system and thermally connected to a heat exchanger; —a sealed protective housing attached to the frame and having an opening to reveal a surface of the heat exchanger.

20 Claims, 2 Drawing Sheets

(56) References Cited

U.S. PATENT DOCUMENTS

| | | | |
|---|---|---|---|
| 2017/0214458 A1* | 7/2017 | Rosenband | ............. G01S 7/003 |
| 2018/0052378 A1 | 2/2018 | Shin et al. | |
| 2018/0107221 A1 | 4/2018 | Droz et al. | |
| 2020/0018835 A1* | 1/2020 | Pei | .......................... G01S 17/10 |

OTHER PUBLICATIONS

International Written Opinion for Application No. PCT/FR2020/051515 dated Nov. 12, 2020, 6 pages.

\* cited by examiner

INTEGRATED AND COMPACT LIDAR MEASUREMENT SYSTEM

CROSS-REFERENCE TO RELATED APPLICATIONS

This application is a national phase entry under 35 U.S.C. § 371 of International Patent Application PCTFR2020/051515, filed Aug. 31, 2020, designating the United States of America and published as International Patent Publication WO 2021/044095 A1 on Mar. 11, 2021, which claims the benefit under Article 8 of the Patent Cooperation Treaty to French Patent Application Serial No. 1909621, filed Sep. 2, 2019.

TECHNICAL FIELD

The present disclosure relates to an integrated and compact LIDAR measurement system.

BACKGROUND

LIDAR is a remote sensing technique for determining the distance to an object by measuring the time of flight of a laser pulse between its emission and its reflection on the object. The laser emits up to several million pulses per second. The laser rangefinder may be coupled to scanning means (scanner) allowing the measurements to be spatialized in a 2D or 3D space and thus allowing an observed scene to be restored in the form of a cloud of points whose origin is the measurement center of the scanner. The combination of laser rangefinder and scanning means is often referred to as "laser scanner."

Such a laser scanner may be associated with a tracking device allowing its geolocation and determination of its attitude. The distance information provided by the laser scanner may then be combined with that provided by the tracking device (position, attitude) to create a georeferenced 3D point cloud.

Document US20130020307 discloses such a device, intended to rest statically on the ground in order to develop an "image" of its environment.

The LIDAR measurement system, made up of the laser scanner coupled to the tracking device, may be carried by a vehicle, such as a motor vehicle or a flying machine, that is capable of moving. The georeferenced 3D model of a scene can then be restored even when that scene is geographically extended. The LIDAR measurement system may also be coupled to a camera device, in order to associate color information with each measurement, that is to say, with each georeferenced point. When carried by a vehicle, the LIDAR measurement system is susceptible to impacts and vibrations, against which it must be protected in order to preserve its integrity and the fidelity of the measurements.

A LIDAR measurement system is generally obtained by assembling a laser scanner and a tracking device, independent of each other. It would generally be desirable to have a robust and compact LIDAR measurement system, in particular, when this system is intended to be embedded in a vehicle, and more particularly when this vehicle is autonomous. This compactness may be obtained by integrating the components forming the laser scanner and the tracking device.

However, this search for compactness comes up against the need to evacuate the heat that is dissipated from the components of the system during their operation. This thermal problem is exacerbated when the system is used in a harsh environment, for example, exposed to dust or humidity. This makes it necessary to protect the components in a sealed manner in a protective case, which does not favor the evacuation of heat. In some cases, the LIDAR measurement system may be placed away from any flow of air that could help cool it, for example, when placed inside the fuselage of a faired drone.

BRIEF SUMMARY

An object of the disclosure is to provide a LIDAR measurement system having these properties of robustness, tightness and compactness while effectively evacuating the heat produced by its components.

With a view to achieving this object, the subject matter of the disclosure proposes a LIDAR measurement system comprising:

- a frame comprising a plurality of side members connected to each other in order to define an internal space;
- a laser scanner, comprising a laser source and a detection unit, attached to one end of the frame and having at least one projecting portion, which is arranged outside the internal space;
- a tracking device attached without any degree of freedom to the detection unit and arranged in a floating manner in the internal space;
- a cooling device comprising at least one heat collector arranged in the measurement system and thermally connected to a heat exchanger;
- a sealed protective case attached to the frame.

According to other advantageous and non-limiting features of the disclosure, taken alone or in any technically practicable combination:

- the detection unit comprises at least one photodetector;
- the laser source and the detection unit are attached to the frame via a single, preferably flexible, attachment point;
- the laser scanner comprises an optical device driven by a motor for scanning a scene with a light beam produced by the laser source;
- the laser source is configured to illuminate a scene with a wide light beam and the detection unit comprises a matrix of photodetectors;
- the laser source and the detection unit are driven by a motor;
- the tracking device is attached to the frame by means of a single, preferably flexible, attachment point;
- the measurement system comprises a housing for receiving a removable battery, the housing being assembled in a sealed manner to the case;
- the measurement system comprises at least one temperature sensor;
- the cooling device comprises a fan;
- the cooling device comprises at least one pipe for a heat transfer fluid thermally connecting the heat collector to the heat exchanger;
- the laser scanner comprises a plurality of electronic units and a heat collector is thermally associated with each electronic unit;
- the frame comprises an attachment device for mechanically attaching the measurement system to a support or to a vehicle;
- the measurement system comprises a camera device secured to the frame.

BRIEF DESCRIPTION OF THE DRAWINGS

Other features and advantages of the present disclosure will become apparent from the following detailed description of example embodiments of the disclosure, which is provided with reference to the accompanying figures, in which.

DETAILED DESCRIPTION

Figure 1:
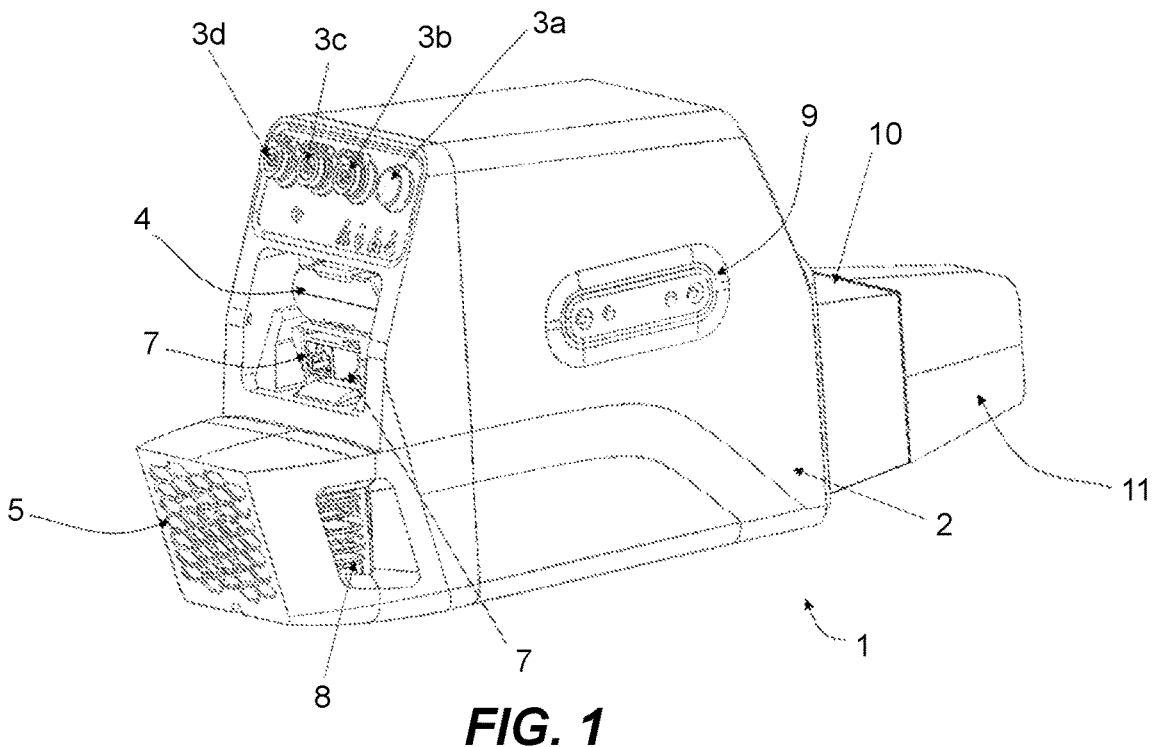
FIG. 1 shows an overall view of a LIDAR measurement system according to the disclosure.

FIG. 1 shows an overall view of a LIDAR measurement system 1 according to the present disclosure.

A protective case 2 impermeable to fluids and dust defines an outer surface of the measurement system 1 and protects the components of this system from the external environment. In the example shown, a front of the protective case 2 reveals a plurality of control buttons and connectors forming a user interface.

Figure 2:
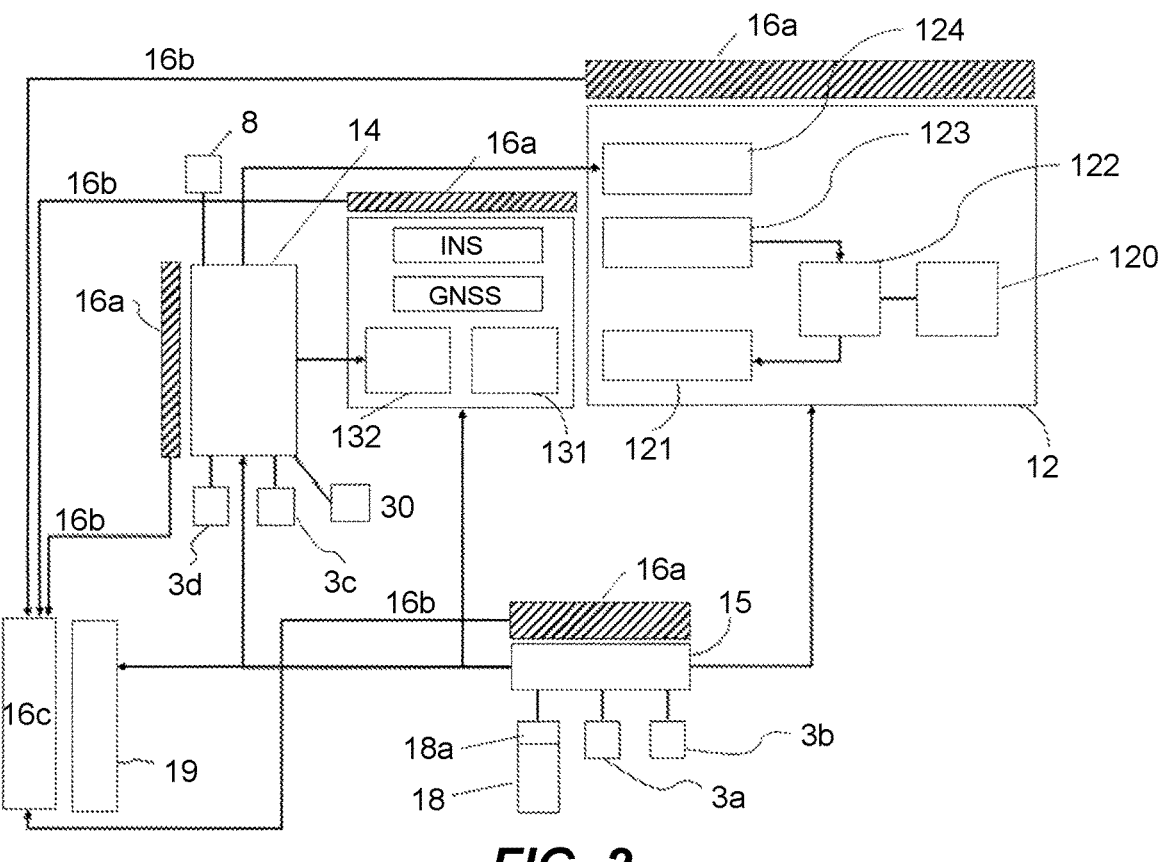
FIG. 2 shows a functional diagram illustrating the operating principles of a measurement system according to the disclosure.

More specifically, the front of the protective case 2 is provided with a system start switch 3a, connected to a power supply unit arranged inside the protective case 2. It is also provided with an external power supply connector 3b that is also connected to the power supply unit. A valve 4 obstructs an opening of a housing intended to receive a removable battery 18 (FIG. 2). The bottom of the housing is equipped with a connector into which the battery 18 can plug when it is slid into the housing. The battery connector 18a is electrically connected to the power supply unit. The housing is assembled in a sealed manner to the protective case 2 and defines a space for receiving the battery 18 that does not communicate with the internal space defined by the protective case 2. This ensures that any dust or fluids that may enter the battery housing do not circulate inside the measurement system 1.

The measurement system 1 can be used either by exploiting the energy of the battery 18 or of another external source of electrical energy to which it is connected by means of the external power supply connector 3b. It may, for example, be the source of electrical energy propelling the vehicle on which the measurement system can be attached. The battery 18 is advantageously removable, which allows it to be replaced quickly when its energy is exhausted. In this way, the measurement system 1 is made available without the need to regularly connect it to a power source to recharge it.

On the interface panel of the protective case 2, there is also a data connector 3c, connected to a system control unit of measurement system 1. This connector is intended to connect the measurement system 1 to a transmission device, for example, a modem or a radio transmission system, external to the measurement system 1 and allowing uploading of the measurements carried out by the measurement system 1 to a base station during a measurement campaign.

As mentioned in the introduction to this application, the measurement system 1 may comprise a camera device. This may be secured to the measurement system 1 by conventional means for attaching this device on a receiving surface 5 of the protective case 2, for example, by a bayonet mechanism. It is sought in all cases to attach the camera device to the laser scanner and to the tracking device without any degree of freedom. The attachment means may, in particular, allow the camera device to be attached to a frame of the measurement system 1 without any degree of freedom.

To operate the camera device, on the front of the interface a timestamping connector 3d has been provided allowing the device to be connected by a cable to the control unit and/or power supply of the measurement system 1. The control unit can then trigger the shots, or these may be triggered autonomously by the camera system, for example, in a "time lapse" mode. The control unit can receive synchronous signals at the acquisition instants from the camera device and by means of the timestamping connector 3d. These signals may be timestamped using a time base of the tracking device and made available by the tracking computing unit.

In an embodiment that is not shown, the timestamping connector 3d is integrated into the attachment means of the camera device, so that the device may be electrically connected to the control unit without the need for an additional connecting cable. It is of course possible to provide the measurement system both with such an integrated timestamping connector and with a separate timestamping connector like the one shown in FIG. 1.

The front is also provided with an input-output connector 7, for example, of the RJ45 type, to connect the control unit to an external computing device in order to configure, diagnose and more generally control the measurement system 1.

Of course, a measurement system 1 according to the present disclosure may have, depending on the need, other connectors and other interface elements or may omit some of those presented here for illustration purposes.

Continuing the description of FIG. 1, the protective case 2 has an opening 8 allowing a projecting face of a heat exchanger 16c to be revealed (FIG. 2) that forms part of a cooling device of the measurement system 1, which will be the subject of a detailed description in a later part of this description. Again, the connection between the protective case 2 and the heat exchanger 16c is sealed, and it is possible, for example, to provide a joint or any other sealing element arranged between these two parts to prevent the passage of fluid and dust inside the protective case 2.

On another side of the protective case 2, there is at least one attachment element 9 of the measurement system 1 allowing it to be secured, for example, by a conventional screw pitch, to a vehicle or to a fixed support. The attachment element 9 is secured to a frame, one of the functions of which is to absorb the forces/vibrations of the vehicle or of the support transmitted to the measurement system via the attachment element 9, and to prevent the active components of the system from being excessively stressed by these mechanical disturbances. In the example shown in FIG. 1, a projecting portion of a laser scanner forms one end of the measurement system 1. This projecting portion comprises a peripheral transparent window 10 protecting the optical device of the laser scanner, driven by a motor that is in turn protected by a head cover 11. The optical device, for example, a device based on a rotating mirror, here is driven in rotation so as to be able to scan a scene with a light beam produced by a laser source of the laser scanner.

The peripheral transparent window 10 and the head cover 11 form parts of the protective case 2. When they are not an integral part of this case, the parts are configured to be assembled in a sealed manner to the rest of the case, for example, by providing them with connecting joints. The generally frustoconical shape of the projecting portion of the laser scanner allows conferring of an aerodynamic profile on the measurement system 1. This profile is advantageous when the measurement system 1 is attached to the outside of a vehicle, for example, a drone, via the attachment element 9 and when it is directly exposed to the flow of air during operation.

FIG. 2 shows a block diagram illustrating the principles of operation of a measurement system 1 according to the disclosure. This diagram shows a laser scanner 12 consisting of a laser source 120 and a detection unit 121 comprising at least one photodetector, for example, a photodiode. The laser scanner 12 of the illustrated example comprises an optical device 122, here a rotating mirror set in motion by a motor 123. As has already been stated, the optical device 122 is arranged opposite the peripheral transparent window 10 and the motor 123 is housed in the head cover 11 of the protective case 2.

As is well known per se, a light beam emitted by the laser source 120 is projected onto a scene by the optical device 122 to scan the scene. The beam reflected by the scene is directed toward the detection unit 121. A processing unit 124 of the laser scanner, connected to the laser source 120 and to the detection unit 121, synchronizes the laser source 120 and the detection unit 121. It determines the time of flight of the beam between its emission by the laser source 120 and its reception at the detection unit 121 to estimate a distance measurement separating the measurement system 1 from the illuminated point of the scene.

Other configurations of the laser scanner 12 are possible. Thus, in an alternative, at least part of the laser source 120 and of the detection unit 121 are set in motion by the motor 123. It is, therefore, not necessary in this case to provide a mobile optical device 122. Optical and electrical communications can flow through the shaft of motor 123 and the communicated data can be processed by the processing unit 124.

In yet another configuration, the laser scanner 12 has no moving parts and, therefore, no motor 123. The laser source 120 in this case illuminates the scene using a beam of very large section and the detection unit 121 is formed by a matrix of photodetectors.

The tracking device 13 comprises several components allowing the measurement system 1 to be located geographically and its attitude to be determined. In particular, it comprises an inertial navigation system INS, possibly accompanied by a magnetometer 131, so as to be able to determine the attitude of the measurement system 1. It also comprises a GNSS satellite navigation system allowing the measurement system 1 to be located geographically. The raw data provided by the inertial navigation systems INS and by satellite GNSS are merged and made available by a tracking computing unit 132.

The laser scanner 12 is mechanically attached, with no degree of freedom, to the tracking device 13. Preferably, the tracking device 13 (and more particularly the inertial navigation system) is secured, with no degree of freedom, to the detection unit 121 of the laser scanner 12.

This mechanical connection without any possible mobility is an important feature of the measurement system 1. It ensures the ability to locate a distance measurement performed by the laser scanner 12 with spatial precision, using the tracking device 13. This precision could not be achieved if the connection had an unblocked degree of freedom, because it would not be possible to know the direction pointed by the laser scanner with certainty and at all times, or even its position, which is imperative when the measurement system is intended to be mounted on a vehicle. It will be detailed in a later passage of this description how this connection can be made.

Continuing the description of the block diagram shown in FIG. 2, the measurement system 1 also comprises a control unit 14. This is connected to the processing 124 and computing 132 units via a data bus so as to be able to supervise them and exchange any information necessary for the proper functioning of the assembly. The control unit 14 may, in particular, configure the laser scanner 12 and the tracking device 13, control them, query them and collect the measurements produced to save them in a memory. The memory of the control unit 14 may be a removable memory, and a sealed opening 6 is provided on the front of the protective case 2 allowing this removable memory to be inserted or extracted in order to connect it to the control unit.

Alternatively or in addition, the measurements may be addressed by the control unit 14 on a communication interface connected to the data connector 3c, in order, for example, to transmit the measurements as they are acquired using a modem or an external radio transmission device connected to the data connector 3c.

The control unit 14 has at least one input-output port connected to the input-output connector 7 in order to connect to an external computing device. Finally, the control unit 14 is also electrically connected to the timestamping connector 3d, to control the triggering of the camera device when the measurement system 1 is equipped therewith. The control unit 14 is configured to associate each shot, the effective instant of which can be provided to it by the camera device via the synchronization interface, with the timestamp information provided by the tracking device 13 to locate it geographically.

The measurement system 1 also provides a power supply unit 15 that processes the energy taken from the battery 18 via the battery connector 18a or the energy received via the external power supply connector 3b, in order to condition it according to a plurality of useful voltages (for example, 3 V, 5 V and 12 V). These voltages are distributed to the various components of the measurement system 1 via a power bus. The power supply unit 15 may, in particular, distribute the voltages necessary for the operation of the control 14, computing 132 and processing 124 units as well as other active components such as the laser source 120, the detection unit 121, the motor 123, and the inertial INS and satellite GNSS navigation systems. The power supply unit 15 is connected to the start switch 3a to turn the measurement system 1 on/off.

Figure 3A:
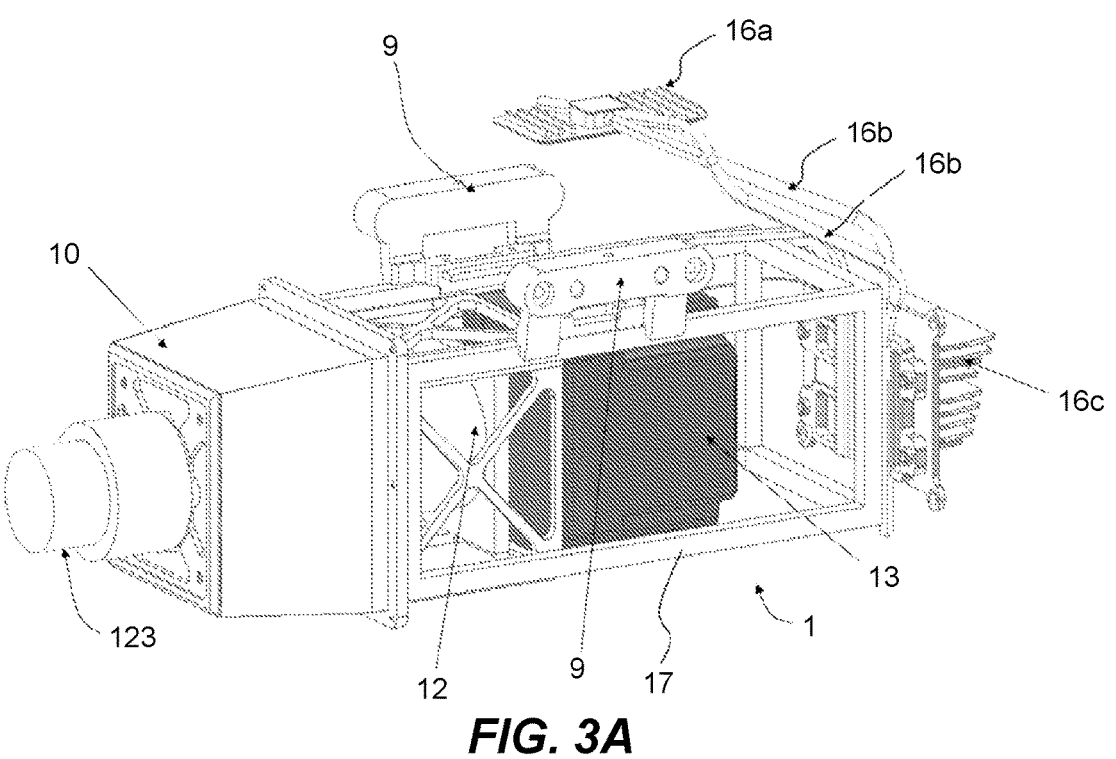
FIGS. 3A and 3B show two views of the internal structure of a measurement system according to the disclosure.
Figure 3B:
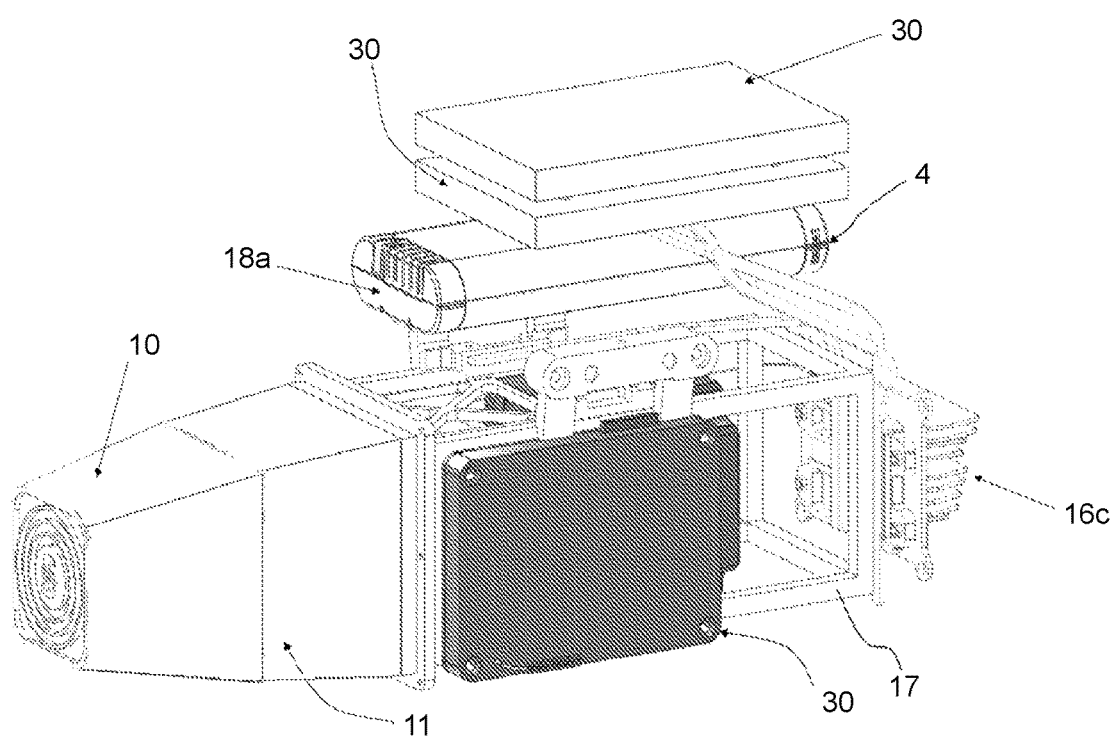

The various electronic units making up the system, namely the processing 124, power supply 15, control 14 and computing 132 units, may be produced in the form of electronic cards 30 (FIG. 3B). Each electronic card 30 may comprise one or more microprocessors or microcontrollers, or any other form of computing means, such as FPGAs. These electronic cards 30 are also provided with memory and any other hardware and software component making it possible to implement the functions described. It could naturally be considered, while remaining within the scope of the present disclosure, to distribute the computing needs of the measurement system 1 according to another division, implementing more units or fewer electronic units than those that have been described as an illustration.

As will be explained later in this disclosure, all of the components of the measurement system 1 that have just been described in detail are integrated in a compact manner inside the protective case 2 in order to protect it from fluids and dust. During operation, these components give off a large quantity of heat that must be evacuated outside the protective case 2 without, however, compromising its sealed nature. For this purpose, the measurement system 1 is provided with a cooling device. This comprises at least one heat collector 16a, and preferably a plurality of heat collectors 16a, arranged or distributed in the system at its hot spots. They may be metal plates, for example, aluminum, arranged in close contact on the components with which they are respectively associated so as to collect their heat. A heat collector 16a may thus be brought into contact with the laser source 120, the tracking device 13, and each of the electronic control 14, power supply 15, processing 124 and computing 132 units. Some heat collectors 16a may be associated with two of these components, for example, inserted sandwiched between two components.

The cooling device also comprises at least one pipe 16b (and preferably a plurality of pipes 16b) for a heat transfer fluid connecting the heat collectors 16a to the heat exchanger 16c, one projecting face of which is exposed through the opening 8 arranged on the protective case 2. The heat energy collected by the heat collectors 16a is brought by the heat transfer fluid up to the heat exchanger 16c. To promote heat exchange with the external environment, this heat exchanger 16c may be provided with a plurality of fins exposed to the external environment of the measurement system 1 through the opening 8 of the protective case 2.

To further promote this exchange, it is possible to provide a fan 19 arranged inside the protective case 2 in order to create a flow of air projecting onto a part of the heat exchanger 16c arranged inside the protective case 2. The fan 19, which is electrically powered by the power supply unit 15, may be put into operation continuously when the measurement system is started, or on command from the control unit 14, when the temperature inside the protective case 2 or at one of its components is excessive. To this end, the measurement system 1 may provide one or a plurality of temperature sensors connected to the control unit 14. Provision may also be made for this to be configured to interrupt the operation of the measurement system 1 or of one of its components, when the temperature measured by a sensor exceeds a predetermined threshold value, in order to avoid deterioration of the measurement system 1 or degradation of its operation.

FIGS. 3A and 3B show how the measurement system 1 according to the disclosure compactly and robustly integrates all the components that have just been described inside the protective case 2.

A frame 17 is provided that is composed of a plurality of interconnected side members. In the example shown, the side members define the sides of a straight block, but such a configuration is given solely as an example, and the side members are more generally interconnected so as to define an internal space.

The laser scanner 12 is fixed to the frame 17 so that a projecting portion of the laser scanner 12, here the optical device 122 and the motor 123, is arranged outside the internal space. In this way, the side members do not intercept the emitted and reflected light beams and do not disturb the measurements. In the example shown, four side members form an end framework of the frame, and the optical device 122 is firmly attached to this end framework.

As already stated, the tracking device 13 (in particular, the inertial navigation system) is attached to the laser scanner 12 and, more particularly, to the detection unit 121, without any degree of freedom. This ensures the accuracy of the measurements taken. According to the disclosure, the tracking device 13 is placed in the internal space defined by the frame 17 in order to be mechanically protected. Moreover, it is not desirable for the tracking device 13 to be firmly attached to the frame 17. On the contrary, and preferably, the tracking device 13 is mounted floating in the frame 17, securely attached to the laser scanner 12. "Floating" means that the tracking device is not rigidly attached to the frame 17. In this way, the transmission of forces or vibrations, transmitted by the frame 17 to the tracking device 13, is avoided, which would tend to modify or stress the perfectly rigid connection with the laser scanner 12. Provision may be made to hold the tracking device 13 to the frame 17 by means of a single, advantageously flexible attachment point, to avoid any excessive movement of this device.

The other components of the LIDAR measurement system 1 and, in particular, the electronic card(s) 30 carrying the various electronic units 14, 15, 124, may be secured to the frame 17 so as to form a very compact assembly. They may either be placed inside the internal space defined by the frame 17 or outside this internal space. Note that it is not necessary to take particular care in arranging these components to manage and dissipate the thermal energy they produce, because the cooling device performs this function on its own.

Finally, the protective case 2 may be clamped onto the assembly formed by the frame 17 and the components of the measurement system 1. The case may also be held to the frame 17 to block any movement of the frame 17 inside the protective case 2.

As will be readily understood, the invention is not limited to the described embodiment, and it is possible to add variants thereto without departing from the scope of the invention as defined by the claims.

The invention claimed is:

1. A LIDAR measurement system comprising:
   a frame comprising a plurality of side members connected to each other to define an internal space;
   a laser scanner, comprising a laser source and a detection unit, attached to one end of the frame and having at least one projecting portion arranged outside the internal space;
   a tracking device attached without any degree of freedom to the detection unit and arranged in a floating manner in the internal space;
   a cooling device comprising at least one heat collector arranged in the measurement system and thermally connected to a heat exchanger; and
   a sealed protective case attached to the frame.

2. The system of claim 1, wherein the detection unit comprises at least one photodetector.

3. The system of claim 2, wherein the laser source and the detection unit are attached to the frame via a single attachment point.

4. The system of claim 3, wherein the laser scanner comprises an optical device driven by a motor for scanning a scene with a light beam produced by the laser source.

5. The system of claim 4, wherein the laser source is configured to illuminate a scene with a wide light beam and the detection unit comprises a matrix of photodetectors.

6. The system of claim 5, wherein the laser source and the detection unit are driven by a motor.

7. The system of claim 6, wherein the tracking device is attached to the frame by a single attachment point.

8. The system of claim 1, further comprising a housing for receiving a removable battery, the housing being assembled in a sealed manner to the sealed protective case.

9. The system of claim 1, further comprising at least one temperature sensor.

10. The system of claim 1, wherein the cooling device comprises a fan.

11. The system of claim 1, wherein the cooling device comprises at least one pipe for a heat transfer fluid thermally connecting the at least one heat collector to the heat exchanger.

12. The system of claim 1, wherein the laser scanner comprises a plurality of electronic units, and wherein a heat collector is thermally associated with each electronic unit.

13. The system of claim 1, wherein the frame comprises an attachment device for mechanically attaching the measurement system to a support or to a vehicle.

14. The system of claim 1, further comprising a camera device secured to the frame.

15. The system of claim 1, wherein the laser source and the detection unit are attached to the frame via a single attachment point.

16. The system of claim 1, wherein the laser scanner comprises an optical device driven by a motor for scanning a scene with a light beam produced by the laser source.

17. The system of claim 1, wherein the laser source is configured to illuminate a scene with a wide light beam and the detection unit comprises a matrix of photodetectors.

18. The system of claim 1, wherein the laser source and the detection unit are driven by a motor.

19. The system of claim 1, wherein the tracking device is attached to the frame by a single attachment point.

20. The system of claim 19, wherein the single attachment point is flexible.

* * * * *